INVENTOR
JOHN MICHAEL MINDEN CARTER

INVENTOR
JOHN MICHAEL MINDEN CARTER

BY Cushman, Darby & Cushman
ATTORNEYS

Dec. 5, 1961  J. M. M. CARTER  3,011,309
SINGLE CHAMBER DUAL THRUST ROCKET MOTOR
Filed Dec. 22, 1959  5 Sheets-Sheet 4

INVENTOR
JOHN MICHAEL MINDEN CARTER

BY Cushman, Darby & Cushman
ATTORNEYS

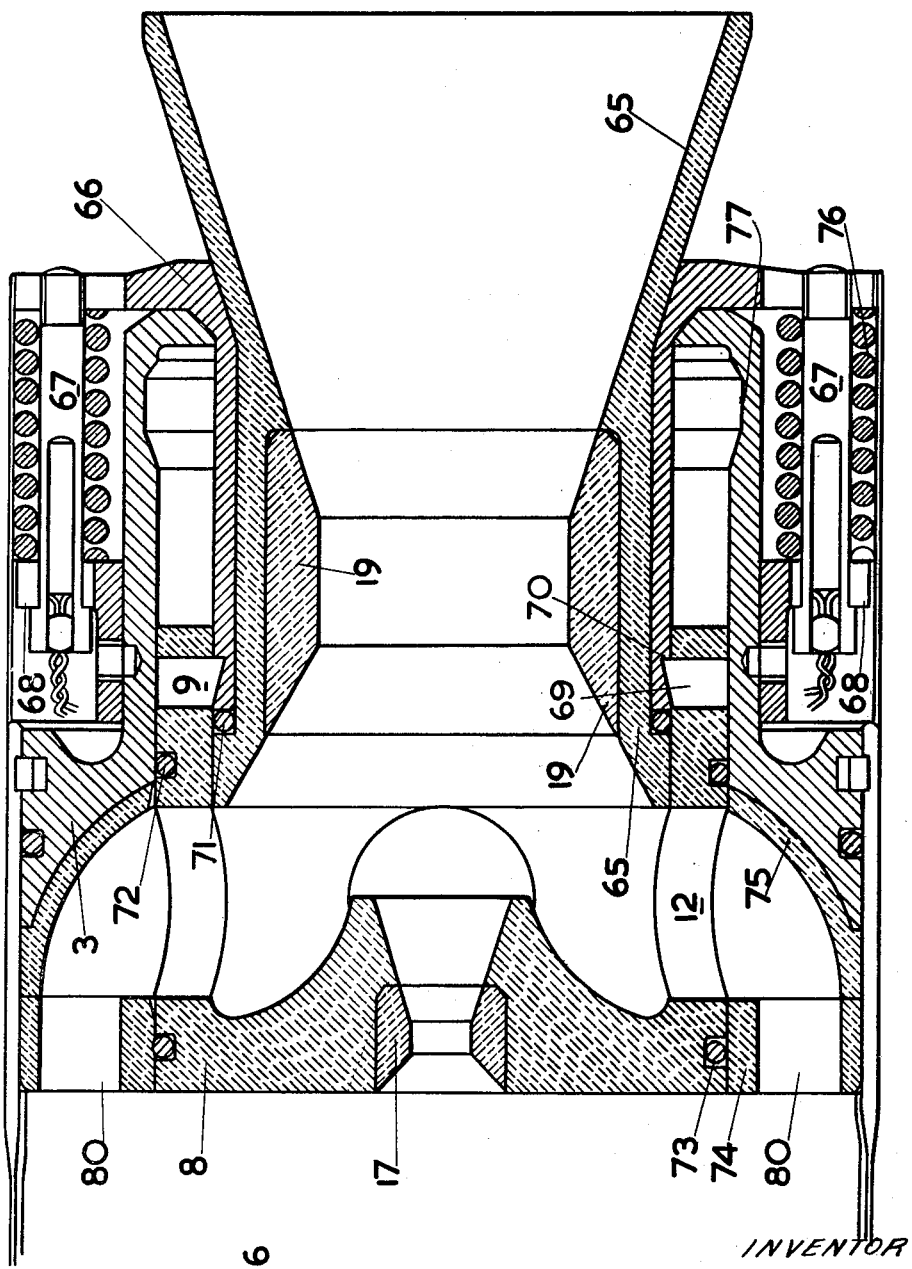

United States Patent Office 3,011,309
Patented Dec. 5, 1961

3,011,309
SINGLE CHAMBER DUAL THRUST ROCKET MOTOR
John Michael Minden Carter, Kidderminster, England, assignor to Imperial Chemical Industries Limited, London, England, a corporation of Great Britain
Filed Dec. 22, 1959, Ser. No. 861,273
Claims priority, application Great Britain Dec. 31, 1958
6 Claims. (Cl. 60—35.6)

This invention is concerned with rocket motors and more particularly with a rocket motor which is designed to operate both as a boost motor and as a sustainer motor, such a motor being hereinafter referred to as a "dual thrust motor."

The pressure generated in the propellant chamber of a rocket motor, and therefore the thrust produced by the motor, is governed in part by the throat size of the rocket motor nozzle and in part by factors which are related to the propellant used. Consequently, in a dual thrust motor in which the boost charge and sustainer charge are located in a single chamber and which makes use of a single nozzle, the required difference in thrust level between the boost and sustainer phases of the motor must be achieved by appropriate selection of the propellant material. With the propellant materials at present available it is difficult, with a dual thrust motor having a single chamber and a single nozzle, to obtain a thrust level ratio of more than about 5:1.

In an alternative design of dual thrust motor, separate chambers and separate nozzles may be employed for boost and sustainer charges. However, the main objection to this design is that a large weight penalty is involved. Weight factors are also involved in the case of the single chamber motor above-mentioned since the rocket motor case must be designed to withstand the higher of the two operating pressures.

It is the object of this invention to provide a single chamber thrust motor capable of providing a relatively high thrust level ratio while operating with a convenient motor gas pressure in both boost and sustainer phases of the motor.

Accordingly this invention provides a single chamber dual thrust rocket motor comprising a nozzle carrier, boost and sustainer nozzles supported therein in spaced and axial alignment, a guide member for the nozzle carrier in which the latter is movable axially of the nozzles, a by-pass passage in the carrier communicating with the boost nozzle, and by-passing the sustainer nozzle, means initially to position the nozzle carrier in such manner that the boost nozzle is operable and the sustainer nozzle is by-passed by motor gases, and a control device responsive to pressure change in the motor at the end of the boost phase to effect movement of the nozzle carrier to close the by-pass passage whereby the sustainer nozzle is operable and means to jettison the boost nozzle at the end of the boost phase.

It will be appreciated that the throat sizes of the boost and sustainer nozzles may easily be selected in order to ensure that the motor of this invention operates at practically the same internal gas pressure in both boost and sustainer phases.

Preferably the nozzle carrier is a piston slidably mounted in the carrier guide, said piston having supported axially in the crown thereof the sustainer nozzle and releasably supported axially in the piston skirt the boost nozzle, said piston being provided with peripheral ports adjacent the crown whereby the motor gases by-pass the sustainer nozzle during the boost phase.

During the boost phase the carrier may be supported in the carrier guide by means of hydraulic fluid and the device responsive to pressure change in the motor at the end of the boost phase will in such a case include a valve for venting the hydraulic fluid in the transitional period between the boost and sustainer phases.

When the rocket motor forms part of a ballistic missile with adequate power supplies and electronic capacity, the end of the boost may be sensed by a pressure transducer, the output of which is monitored and a signal sent to some form of electrically-initiated venting device to fire a series of explosive bolts mounted on the carrier guide which may be spring biased. On a simpler missile it may be more convenient to use a self-contained pressure-sensitive valve which is operated directly in response to changes in motor gas pressure. In the latter case a further simplification may be effected by incorporating the valve in the boost nozzle, the latter being in two parts, one of which is arranged to move at the appropriate time to a position in which the hydraulic fluid can escape from the system.

It will be appreciated that suitable sealing means are employed in the device of the invention to prevent motor gases entering the hydraulic fluid circuit, and any seal or seals to which the motor gases would normally have access in the initial position of the nozzle carrier are advantageously protected by a releasable cover of insulating material which can be automatically displaced from the seal when the carrier moves into its second position.

The automatic jettisoning of the boost nozzle in the sustainer phase is necessary since it otherwise gives rise to an unsuitable expansion ratio while the missile is still at low altitude. The boost nozzle is therefore releasably secured in the carrier in some simple manner, for example, by means of a ball release arrangement.

The invention is illustrated by way of example in the accompanying drawings of which:

FIGURE 6 is a sectional view of a further alternative embodiment to that of FIGURE 1.

Figure 1:
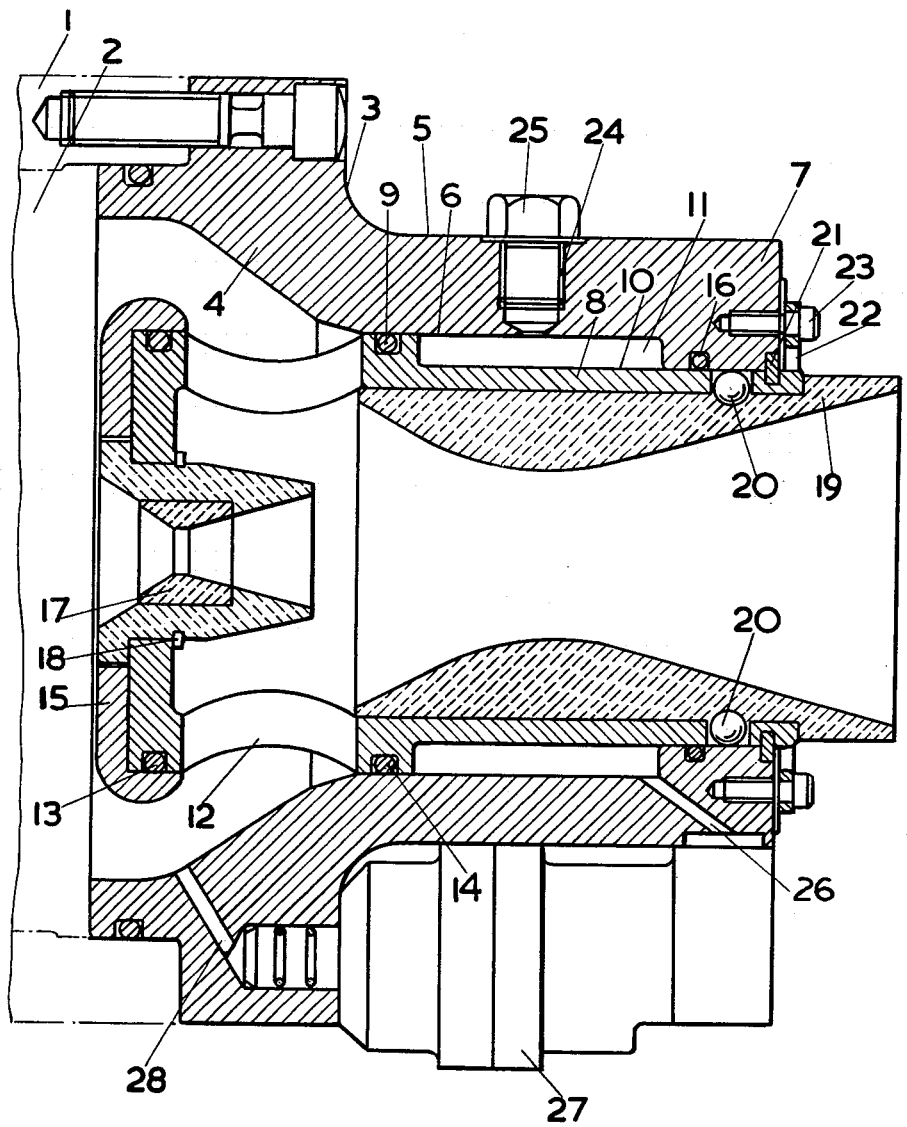
FIGURE 1 is a sectional view of the rear end closure part of a rocket motor with the parts shown in the positions they assume during the boost phase.

Referring to FIGURE 1, there is shown a rocket motor comprising a casing 1 which encloses a propellant chamber 2 and on the rear end of which there is bolted an end closure 3. The form of the end closure 3 departs from that of a conventional part spherical end closure and comprises a boss 4 and an integral cylindrical extension 5 open to the atmosphere at its rear end. The inner diameter of the boss 4 converges in the rearward direction to the inner diameter of the main part 6 of the extension 5 and the rear end part 7 of the extension 5 is of reduced inner diameter.

Mounted within the end closure 3 is a nozzle carrier 8 in the form of a hollow piston. The carrier 8 has a forward part 9 of greater diameter, which is a sliding fit within the part 6 of the cylindrical extension 5, and a rear part 10 of lesser diameter which is a sliding fit in the rear end part 7 of the extension 5. The extension 5 thus constitutes a guide for the nozzle carrier 8 and between this guide and the carrier 8 there is defined an annular space 11.

In the forward part 9 of the carrier are provided four circumferentially-spaced ports 12 which have greater combined cross-sectional area than that of the boost nozzle described hereinafter and which establish communication between the propellant chamber 2 and the hollow interior of the carrier 8 when the latter is in the position shown in FIGURE 1. On both sides of the ports 12 are O-ring seals 13, 14 which respectively seal the carrier 8 in the carrier guide in the initial and final positions of the carrier 8. The seal 13 is protected from the propellant gases in the boost phase of the motor by means of an insulating shroud 15 fitted on the forward end of the carrier 8 and covering the seal 13. A further O-ring seal 16 seals the rear part of the carrier 8 in the rear end 7 of the extension 5.

Mounted on the central axis of the carrier 8 and in an aperture in the forward end face thereof is a sustainer nozzle 17 secured to the carrier 8 by means of a clip 18. A boost nozzle 19 arranged co-axially with respect to the sustainer nozzle 17 and spaced therefrom is fitted within the rear part 10 of the carrier 8. The nozzle 19 is releasably secured in position in the carrier 8 by a series of balls 20 which seat in an annular groove in the outer surface of the nozzle 19 and engage in circumferentially spaced holes in the nozzle carrier 8, thereby locking the nozzle 19 in the axial direction. The nozzle carrier 8 is initially located in the position shown in FIGURE 1 by means of a circlip 21 which projects from a groove in the rear end of the carrier 8 and is held by soft aluminium tabs 22 secured by screws 23 to the rear end face of the extension 5.

In the upper wall of the extension 5 is a filler hole 24 through which hydraulic fluid can be supplied to the annular space 11, the hole 24 being sealed by a plug 25 in the final step of assembly of the system. Leading from the space 11 through the lower wall of the extension 5 is a vent passage 26 which communicates with a pressure-sensitive valve 27, the operation of which will be described in detail hereafter. A gas duct 28 is provided in the end closure 3 for admitting a branch stream of motor gas into the valve 27.

Figure 3:
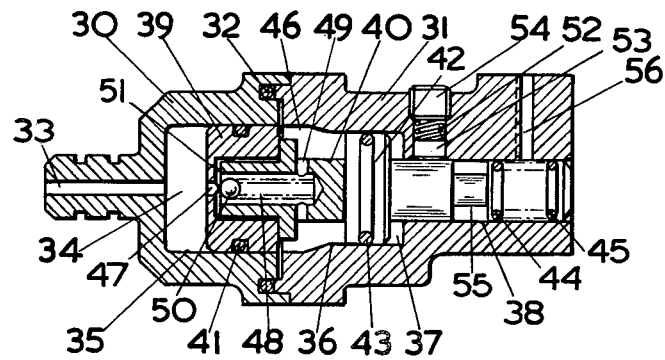
FIGURE 3 is a sectional view of a hydraulic fluid release valve employed in the arrangement shown in FIGURE 1.

Referring now to FIGURE 3, the valve comprises a valve body in two parts, 30, 31, which are screwed together, the joint being sealed by an O-ring 32. At the left-hand end as shown in the drawing the part 30 of the valve body has an integral projection provided with a central bore 33 for the entry of motor gases into the valve chamber 34 from the duct 28 shown in FIGURE 1.

The cross-section of the valve chamber 34 is largest at 35 and converges to a lesser diameter at 36, the right-hand end wall of the chamber 34 being constituted by a shoulder 37 beyond which there is provided a counterbore 38 in the part 31 of the valve body.

Located within the valve chamber 34 is a valve spindle in the form of a differential piston constructed in two parts 39, 40 which are screwed together. The part 39 is a sliding fit in the part 35 of the valve chamber and is sealed therein by means of an O-ring 41. The other part 40 of the spindle is a sliding fit at its right-hand end in the counterbore 38 and is formed intermediate its end with a collar 42 which is a sliding fit in the part 36 of the valve chaber 34. O-ring seals 43, 44, 45 seal the various parts of the spindle within the valve body.

The parts 39 and 42 of the valve spindle thus have between them an annular space 46. The part 39 has a central aperture 47 co-axial with an internal bore 48 in a part 40, communication between the bore 48 and annular space 46 being made by a number of radial passages 49. A spring-loaded ball 50 is housed within the bore 48 and co-operates with a washer 51 to seal the aperture 47 from the inside and provide a non-return valve.

Figure 4:
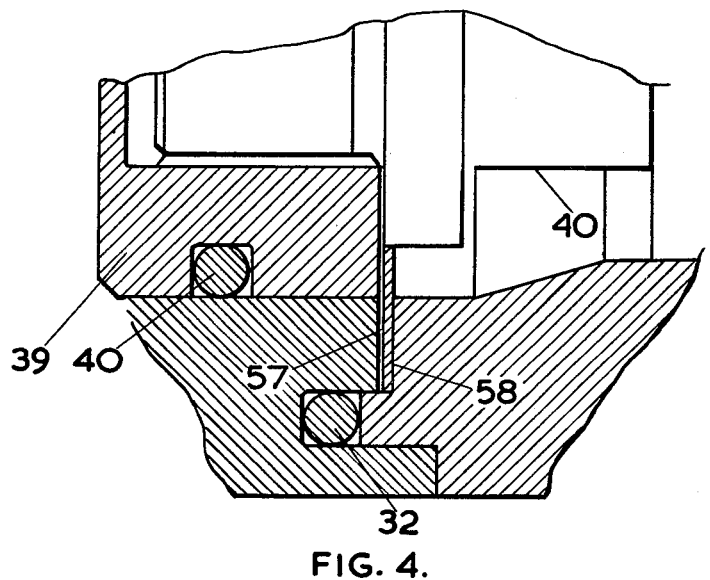
FIGURE 4 is a detail view of part of FIGURE 3.

In the part 31 of the valve body there is formed a transverse bore 52 which communicates with the counterbore 38 and within which is positioned a peg 53 biased by a spring and screw arrangement 54 towards the counterbore 38. The part 40 of the valve spindle has a portion of reduced diameter to provide an annulus 55 which will just accommodate the peg 53 when the annulus 55 is aligned with the transverse bore 52. To the right of the bore 52 is a further transverse passage 56 provided in the part 31 of the valve body and this passage terminates at the counterbore 38 at its lower end and is connected at its upper end to the vent passage 26 (FIGURE 1). The dimensions of the parts of the valve are such that from the illustrated position of the valve spindle, in which it is temporarily held by means of two shear discs 57, 58 arranged as shown in FIGURE 4, the extent to which the spindle can move to the right before the collar 42 engages the shoulder 37 is insufficient to bring the annulus 55 into communication with the passage 56, while the extent to which the spindle can move to the left is such that the annulus 55 can move into alignment with the bore 52.

The rocket motor is assembled with the parts as shown in FIGURES 1 and 3 and the annular space 11 surrounding the carrier 8 and the vent passage 26 are filled with suitable hydraulic fluid so as to support the carrier 8 in its initial position. When the motor is fired, propellant gases generated in the chamber 2 flow out of the motor via the ports 12 and boost noozle 19, the sustainer nozzle being by-passed during this stage. A branch stream of motor gas passes through the duct 28 and bore 33 into the valve chamber 34 wherein it urges the ball 50 away from its seat and flows into the space 46. The pressure on the valve spindle at this stage causes it to shear the shear discs 57, 58 and move to the right until the collar 42 is held at the shoulder 37.

Figure 2:
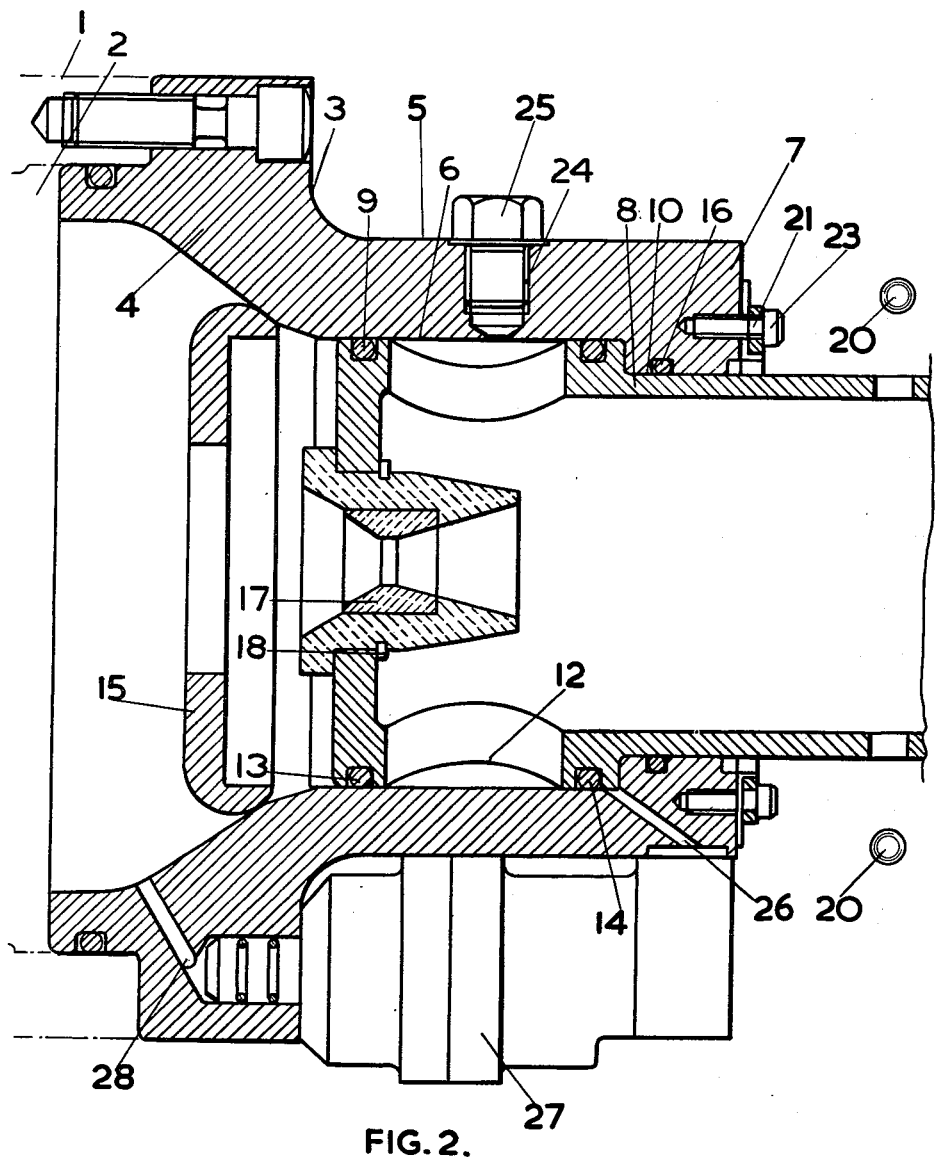
FIGURE 2 is a view of the embodiment of FIGURE 1 in the sustainer phase of the motor.

At the end of the boost phase the motor gas pressure falls and the ball valve 50 in the valve spindle closes, but gas is trapped in the space 46 at the initial motor pressure and when the motor gas pressure has dropped sufficiently to be overcome by the differential pressure on the valve spindle the latter moves to the left. This movement of the spindle brings the annulus 55 and peg 53 into alignment and the peg 53 is forced into the annulus 55 to lock the valve spindle axially. This action of the spindle uncovers the passage 56 and residual motor gas pressure at the end of the boost phase is sufficient to shear the tabs 22 holding the carrier 8 and then move the nozzle carrier 8 into the position shown in FIGURE 2, thus expelling the hydraulic fluid from the system. The movement of the carrier 8 into the extension 5 automatically disengages the shroud 15 from the O-ring seal 13 and, as shown in FIGURE 2, the ports 12 are now sealed off and motor gas can only pass out through the sustainer nozzle 17. In the new and final position of the carrier 8 the balls 20 have moved beyond the rear end of the extension 5 and fall away freely, thus releasing the boost nozzle 19 which is then jettisoned.

The hydraulic arrangement described above is especially advantageous in giving a smooth changeover from the boost to the sustainer phase of the motor. Moreover, there is sufficient delay in the system which can be increased by throttling the fluid flow path, if desired, to enable the valve to be designed with convenient differential area proportions.

Figure 5:
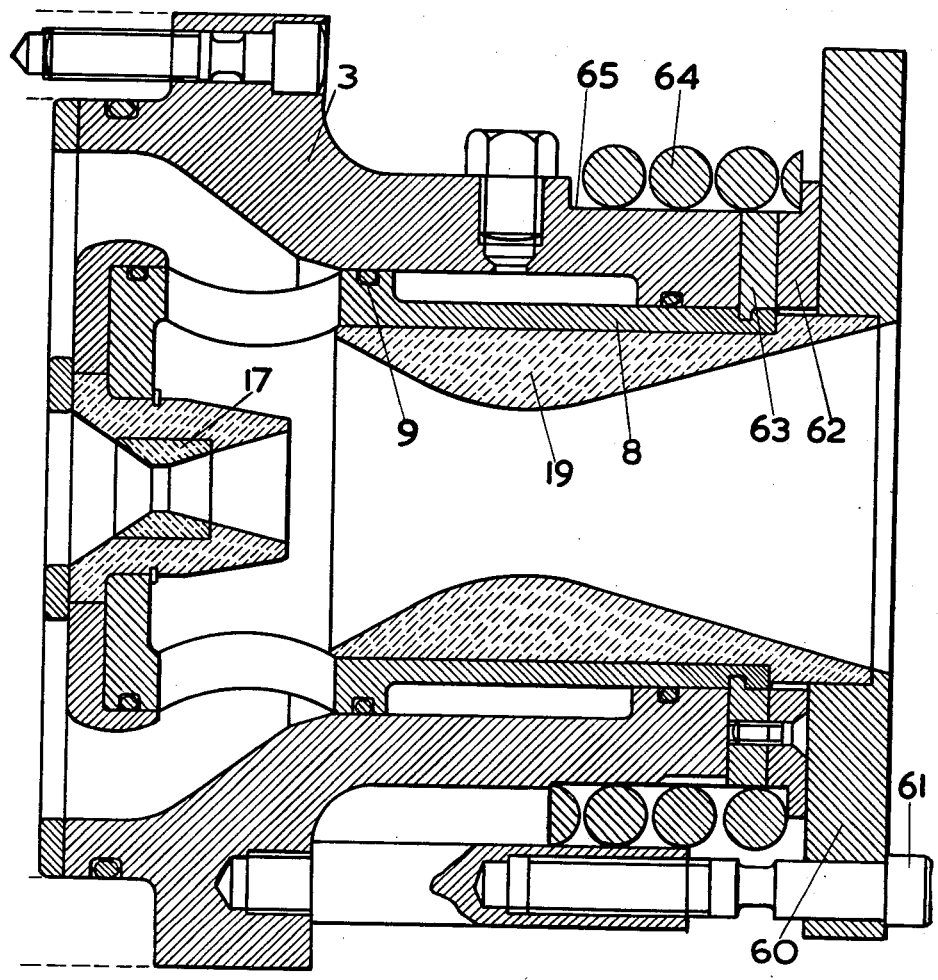
FIGURE 5 is a sectional view of an alternative embodiment to that of FIGURE 1.

Referring to FIGURE 5, the general arrangement corresponds closely with that of FIGURE 1 in the employment, inter alia, of an end closure 3 and a nozzle carrier 8 in the form of a hollow piston in which are mounted boost and sustainer nozzles 19 and 17 respectively.

The essential differences between the embodiments illustrated in FIGURES 1 and 5 reside in the actuating device employed to effect the change from boost to sustainer phases.

In the embodiment illustrated in FIGURE 5 the boost choke 19 and carrier 8 are restrained during the boost phase by a flange 60 and explosive bolts 61. A further split flange 62 diagonal line 63 co-operates with a coil spring 64 housed in an annular rebate 65 machined in the end closure 3. The use of the coil spring 64 ensures a consistent operation of the device despite variations in the pressure remaining in the motor at the time the bolts are fired to release the choke carrier and the boost choke.

Preferably the carrier is not supported by hydraulic fluid and sealing ring 9 may therefore be omitted with a consequent reduction in frictional losses. However, if desired, the use of hydraulic fluid may be retained as a damping medium to control the rate of changeover from boost to sustainer phases.

The ball detent 20 (reference to FIGURE 1) is omitted in the embodiment shown in FIGURE 5 since the flange 60 serves to retain the boost choke.

Referring to FIGURE 6, this embodiment shows an assembly such as might be used on a rocket where weight, space and resistance, prolonged exposure to hot motor gases are important factors.

The general arrangement is again similar to the embodiments already described having an end closure 3 with a nozzle carrier 8 for the boost and sustainer nozzles 19 and 17 respectively. The end closure is made of an aluminium alloy and the carrier of an erosion resistance insulating material such as a high pressure asbestos/phenolic resin moulding compound.

The sustainer nozzle is formed by a carbon choke 17 with an expansion cone moulded integrally with the carrier.

The boost nozzle consists of a carbon choke 19 with a moulded asbestos/phenolic choke holder and expansion cone 65. Bonded to the outside of the nozzle is an aluminium alloy flanged member 66 which in conjunction with a set of explosive bolts 67, and a further flange 68 restrain the boost nozzle and carrier from moving under the action of internal pressure.

The boost nozzle is secured to the carrier by a set of dowels 69 having bevelled ends which engage in a groove formed in the flanged aluminium member 66.

An O-ring seal 71 prevents leakage of gas between the boost nozzle and carrier and another seal 72 prevents leakage between the carrier and the closure. A third seal 73 on the carrier is protected by a moulded asbestos/phenolic shield 74.

During the boost phase the rocket motor gases flow through ports 80 in the shield 74 and ports 12 in the carrier by-passing the sustainer nozzle. The end closure is protected from the gases by an insulation lining 75 and each set of ports has an area several times larger than that of the boost nozzle throat so that the pressure drop is not excessive.

At the end of the boost phase, the pressure drop in the motor actuates a pressure sensitive device to send a firing impulse to a series of explosive bolts 67 which fracture, leaving the boost nozzle carrier free to move under the influence of the remaining internal pressure and coil springs 76. To facilitate this movement it is preferable to reduce the friction of the O-ring seals by making them of anti-frictional material, for example, polytetrafluoroethylene, or, coating the surface on which they slide with a similar material.

When the carrier has completed its travel the dowels 69 are brought into alignment with a recess 77 in the wall of the rear end closure 3 and are able to move outwardly releasing the boost nozzle assembly which is jettisoned.

The seal 73 which was previously protected by the shield 74 has now moved to the right (reference to FIGURE 6) to take the place of the seal 72 and the sustainer nozzle is in its operative position.

I claim:

1. A single chamber dual thrust rocket motor comprising a propellant chamber for the generation of gas, a guide member adjacent thereto, a nozzle carrier disposed in said guide member and axially slidable therein, a boost nozzle and a sustainer nozzle, said nozzles being supported in said carrier in spaced and axial alignment, said sustaining nozzle communicating with said chamber, said carrier having a by-pass passage communicating with said boost nozzle for by-passing part of said gas around said sustainer nozzle, means positioning said carrier so that said boost nozzle is operable to receive gas through said by-pass passage, and a control device in said motor responsive to motor gas pressure changes and operable to effect sliding of said carrier to close said by-pass passage and render said booster nozzle inoperative.

2. A rocket motor as claimed in claim 1 comprising means for jettisoning said boost nozzle when said carrier has been slid to render the sustainer nozzle operable.

3. A single chamber dual thrust rocket motor comprising a guide member, a nozzle carrier disposed in said guide member and axially slidable therein, a boost nozzle and a sustainer nozzle, said nozzles being supported in said carrier in spaced and axial alignment, said carrier having a by-pass passage communicating with said boost nozzle and by-passing said sustainer nozzle, means positioning said carrier so that said boost nozzle is operable, and a control device in said motor responsive to motor gas pressure changes and operable to effect sliding of said carrier to close said by-pass passage and render said sustainer nozzle operable, said nozzle carrier comprising a piston having a head and skirt, said sustainer nozzle being mounted in said head and said booster nozzle being mounted releasably in said skirt, said piston having peripheral ports forming by-pass passages opening through said skirt adjacent said head.

4. A single chamber dual thrust rocket motor comprising a guide member, a nozzle carrier disposed in said guide member and axially slidable therein, a boost nozzle and a sustainer nozzle, said nozzles being supported in said carrier in spaced and axial alignment, said carrier having a by-pass passage communicating with said boost nozzle and by-passing said sustainer nozzle, means positioning said carrier so that said boost nozzle is operable, a control device in said motor responsive to motor gas pressure changes and operable to effect sliding of said carrier to close said by-pass passage and render said sustainer nozzle operable, and means for jettisoning said boost nozzle when said carrier has been slid to render the sustainer nozzle operable, said jettisoning means comprising a series of locking elements, said elements engaging in an annular groove in said boost nozzle and in spaced holes in the nozzle carrier.

5. A single chamber dual thrust rocket motor comprising a guide member, a nozzle carrier disposed in said guide member and axially slidable therein, a boost nozzle and a sustainer nozzle, said nozzles being supported in said carrier in spaced and axial alignment, said carrier having a by-pass passage communicating with said boost nozzle and by-passing said sustainer nozzle, means positioning said carrier so that said boost nozzle is operable, and a control device in said motor responsive to motor gas pressure changes and operable to effect sliding of said carrier to close said by-pass passage and render said sustainer nozzle operable, said control device being a hydraulic fluid release valve.

6. A single chamber dual thrust rocket motor comprising a guide member, a nozzle carrier disposed in said guide member and axially slidable therein, a boost nozzle and a sustainer nozzle, said nozzles being supported in said carrier in spaced and axial alignment, said carrier having a by-pass passage communicating with said boost nozzle and by-passing said sustainer nozzle, means positioning said carrier so that said boost nozzle is operable, a control device in said motor responsive to motor gas pressure changes and operable to effect sliding of said carrier to close said by-pass passage and render said sustainer nozzle operable, a series of explosive bolts mounted on said guide member, said control device being arranged to actuate said bolts.

References Cited in the file of this patent

UNITED STATES PATENTS

| | | |
|---|---|---|
| 2,408,099 | Sherman | Sept. 24, 1946 |
| 2,828,604 | Hirsch et al. | Apr. 1, 1958 |
| 2,880,576 | Kappus | Apr. 7, 1959 |

FOREIGN PATENTS

| | | |
|---|---|---|
| 659,758 | Great Britain | Oct. 24, 1951 |